US007145477B1

United States Patent
McBain

(10) Patent No.: US 7,145,477 B1
(45) Date of Patent: Dec. 5, 2006

(54) ANTI-TERRORIST AIRCRAFT PILOT SENSOR SYSTEM AND METHOD

(76) Inventor: Theodore McBain, 1335 N. Lake Blvd., Tahoe City, CA (US) 96145

( * ) Notice: Subject to any disclaimer, the term of this patent is extended or adjusted under 35 U.S.C. 154(b) by 37 days.

(21) Appl. No.: 10/251,666

(22) Filed: Sep. 19, 2002

Related U.S. Application Data

(60) Provisional application No. 60/323,754, filed on Sep. 19, 2001.

(51) Int. Cl.
*G08B 21/00* (2006.01)
(52) U.S. Cl. .................. 340/945; 340/5.82; 701/14
(58) Field of Classification Search ............... 340/945, 340/575, 576, 5.84, 5.2, 5.81, 5.82, 5.83; 701/14, 3; 713/200; 299/118.5
See application file for complete search history.

(56) References Cited

U.S. PATENT DOCUMENTS

| | | | |
|---|---|---|---|
| 4,390,861 A | 6/1983 | Cohen et al. | |
| 4,586,387 A | 5/1986 | Morgan et al. | 73/862.05 |
| 4,914,721 A | 4/1990 | Glaeser et al. | 307/116 |
| 5,479,162 A | 12/1995 | Barger et al. | 340/945 |
| 5,686,765 A | 11/1997 | Washington | 307/10.5 |
| 5,938,706 A | 8/1999 | Feldman | 701/32 |
| 6,311,272 B1 | 10/2001 | Gressel | 713/186 |
| 6,385,513 B1* | 5/2002 | Murray et al. | 701/14 |
| 6,526,337 B1* | 2/2003 | Gardner | 701/3 |
| 6,641,087 B1* | 11/2003 | Nelson | 244/118.5 |
| 6,658,572 B1* | 12/2003 | Craig | 713/200 |
| 6,762,684 B1* | 7/2004 | Camhi | 340/573.1 |
| 6,897,790 B1* | 5/2005 | Orton | 340/945 |
| 2001/0026316 A1 | 10/2001 | Senator | 348/148 |
| 2002/0093565 A1 | 7/2002 | Watkins | 348/148 |
| 2002/0111777 A1 | 8/2002 | David | 702/189 |

* cited by examiner

*Primary Examiner*—Brent A. Swarthout
(74) *Attorney, Agent, or Firm*—Sierra Patent Group, Ltd.

(57) ABSTRACT

The disclosed device is directed toward an anti-terrorist aircraft pilot sensor system. The anti-terrorist aircraft pilot sensor system comprises a pilot sensor including at least one of a biometric sensor and a physiological sensor. An input component is operatively coupled to the pilot sensor. An aircraft central processor unit is operatively coupled to the pilot sensor. The aircraft central processor unit includes a transceiver operatively coupled to the aircraft central processor unit. The anti-terrorist aircraft pilot sensor system comprises an autopilot of the aircraft operatively coupled to the aircraft central processor unit. A ground control located remote from the aircraft is operatively coupled to the aircraft central processor unit. The ground control includes a transceiver coupled to the ground control. An aircraft override is operatively coupled to the ground control and operatively coupled to the aircraft central processor unit.

15 Claims, 3 Drawing Sheets

US 7,145,477 B1

ANTI-TERRORIST AIRCRAFT PILOT SENSOR SYSTEM AND METHOD

CROSS-RELATED

This application is a Utility application which claims priority to an earlier filed U.S. Provisional Application No. 60/323,754, filed Sep. 19, 2001, and expressly incorporates by reference the provisional application.

BACKGROUND

The present disclosure relates to the field of anti-terrorist security systems for commercial aircraft. In particular, the present disclosure relates to an anti-terrorist aircraft pilot sensor system.

In current aircraft, pilots and/or flight crews are vulnerable to catastrophic events that may place the aircraft and all aboard the aircraft in jeopardy. Events, such as, physical mishaps and even terrorist attacks on the pilot and crew are possible. If the pilot, and crew capable of operating the aircraft become disabled, then the aircraft could be placed into peril. Also, if terrorists or highjackers disable the pilot, then they can take command of the aircraft and use it for their own sinister interests that may place others at risk of injury or even death. What is needed is a system that can prevent the risks of injury and even great tragedy due to the loss of a pilot or aircraft highjacking.

SUMMARY

The disclosed device is directed toward an anti-terrorist aircraft pilot sensor system. The anti-terrorist aircraft pilot sensor system comprises a pilot sensor including at least one of a biometric sensor and a physiological sensor. An input component is operatively coupled to the pilot sensor. An aircraft central processor unit is operatively coupled to the pilot sensor. The aircraft central processor unit includes a transceiver operatively coupled to the aircraft central processor unit. The anti-terrorist aircraft pilot sensor system comprises an autopilot of the aircraft operatively coupled to the aircraft central processor unit. A ground control located remote from the aircraft is operatively coupled to the aircraft central processor unit. The ground control includes a transceiver coupled to the ground control. An aircraft override is operatively coupled to the ground control and operatively coupled to the aircraft central processor unit.

The disclosed method is directed toward a method of operating an anti-terrorist aircraft pilot sensor system. The method of operating an anti-terrorist aircraft pilot sensor system comprises activating a pilot sensor attached to the aircraft pilot. The method includes sensing biometric parameters of the aircraft pilot and sensing physiological parameters of the aircraft pilot. The method includes comparing the sensed biometric and physiological parameters of the aircraft pilot with stored data and detecting a discontinuity between the biometric and physiological parameters and the stored data. The method also includes transmitting a signal to a central processor unit of the aircraft that the discontinuity exists and processing the signal in the central processor unit. The method includes activating an aircraft autopilot and transmitting a signal to a ground control.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
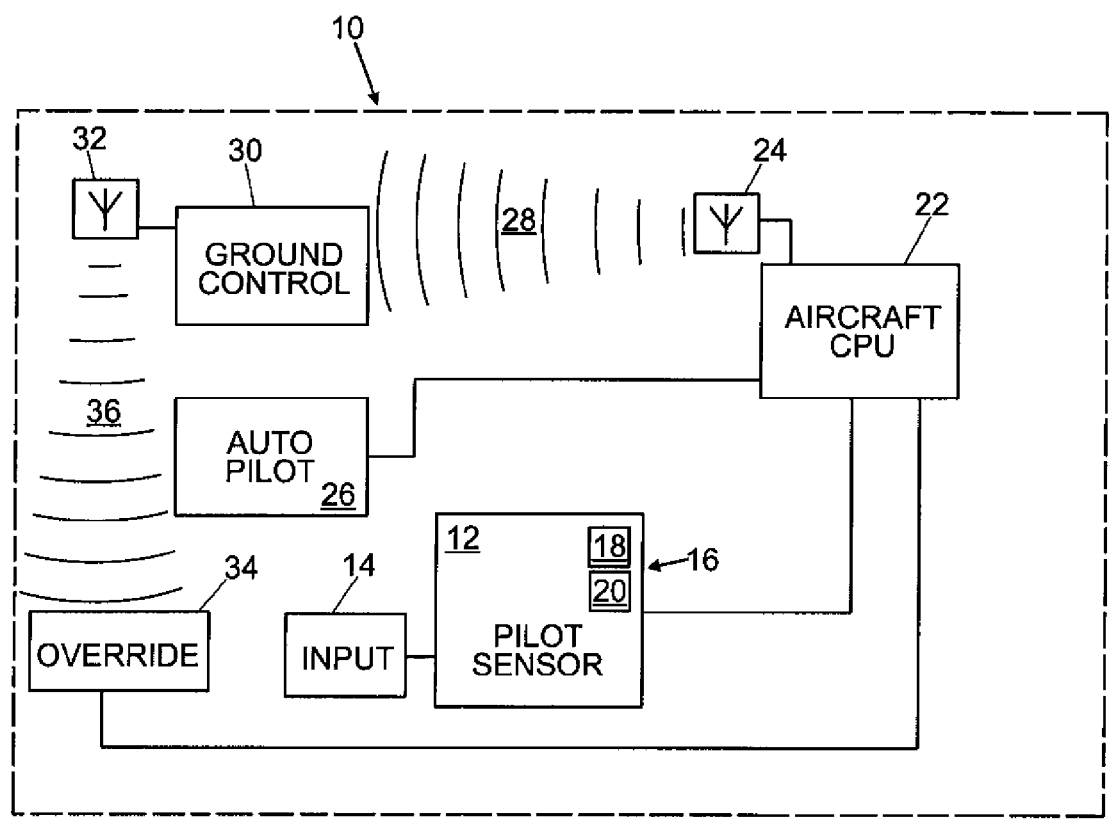
FIG. 1 is a schematic of an exemplary anti-terrorist aircraft pilot sensor system.

FIG. 1 illustrates a schematic of an exemplary anti-terrorist aircraft pilot sensor system, or simply, pilot sensor system 10. The pilot sensor system 10 includes a pilot sensor 12. The pilot sensor 12 is operatively coupled to an input component 14 that provides data input for activation and deactivation of the pilot sensor 12. For example, the input component 14 can be a keypad with alpha-numeric keys that are configured to accept user inputs, such as, a code in order to activate or deactivate the pilot sensor 12. The input component 14 can also be audio or video, bar code reader, microphone, camera, thermal imager, eye retinal scanner or any combination thereof, for inputting a code to activate the pilot sensor 12. The pilot sensor 12 comprises a sensor or a plurality of sensors, 16 that sense various biometric and/or physiological information of at least one of a pilot and co-pilot of the aircraft. Fingerprints or eye retina patterns are non-limiting examples of biometric information sensed by the sensors 16. The sensors 16 can also measure physiological parameters, such as heart rate, blood pressure, pulse, and the like. The sensors 16 can be specific to the parameters sensed, such as a biometric sensor 18 or a physiological sensor 20. The biometric sensor 18 senses biometric parameters, such as, fingerprints, eye retina patterns, and the like. The physiological sensor 20 senses physiological parameters such as heart rate, blood pressure, pulse, or even adrenaline levels, and the like.

The pilot sensor 12 is operatively coupled to an aircraft central processor unit 22. The aircraft central processor unit 22 includes a processor, micro-processor and any combination thereof such that information can be processed, and programs can be executed. The aircraft central processor 22 also includes communication busses, memories, memory busses and input/output (I/O) circuitry such that information can be processed and signals transmitted and received. A transceiver 24 is operatively coupled to the aircraft central processor 22. Signals can be transmitted and received by wireless communication via the transceiver 24. The aircraft central processor 22 receives inputs from the pilot sensor 12 and operates certain functions based on the inputs from the pilot sensor 12. The aircraft central processor 22 is operatively coupled to the autopilot 26. The aircraft central processor 22 can perform the function of placing the aircraft on an autopilot control 26. Autopilot 26 is the automatic flight control of the aircraft along a flight path without pilot intervention. The aircraft central processor 22 can also perform the function of transmitting an emergency signal 28 to a ground control 30. The emergency signal 28 can include information vital to the safety of the aircraft, such as location, heading, altitude, aircraft system operating parameters, distress messages and the like. The aircraft central processor 22 can send the emergency signal 28 via the transceiver 24. The ground control 30 being operatively coupled to a transceiver 32 can also communicate with the aircraft central processor 22. In one embodiment, the ground control 30 can send and receive information to and from the aircraft central processor unit 22 in addition to the emergency signal 28. The aircraft operability conditions taken from instrumentation and controls, audio and video information within the cabin of the aircraft, and the like, can be provided to the ground control 30. The ground control 30 is also operatively coupled to an emergency override 34. The emergency override, or simply override, 34 can be activated to override certain functions of the aircraft, such as, the autopilot 26. An emergency override signal can be transmitted via wireless communications to the override 34 from the ground control 32 in order to deactivate the autopilot 26 and place the aircraft into manual flight control.

Figure 2:
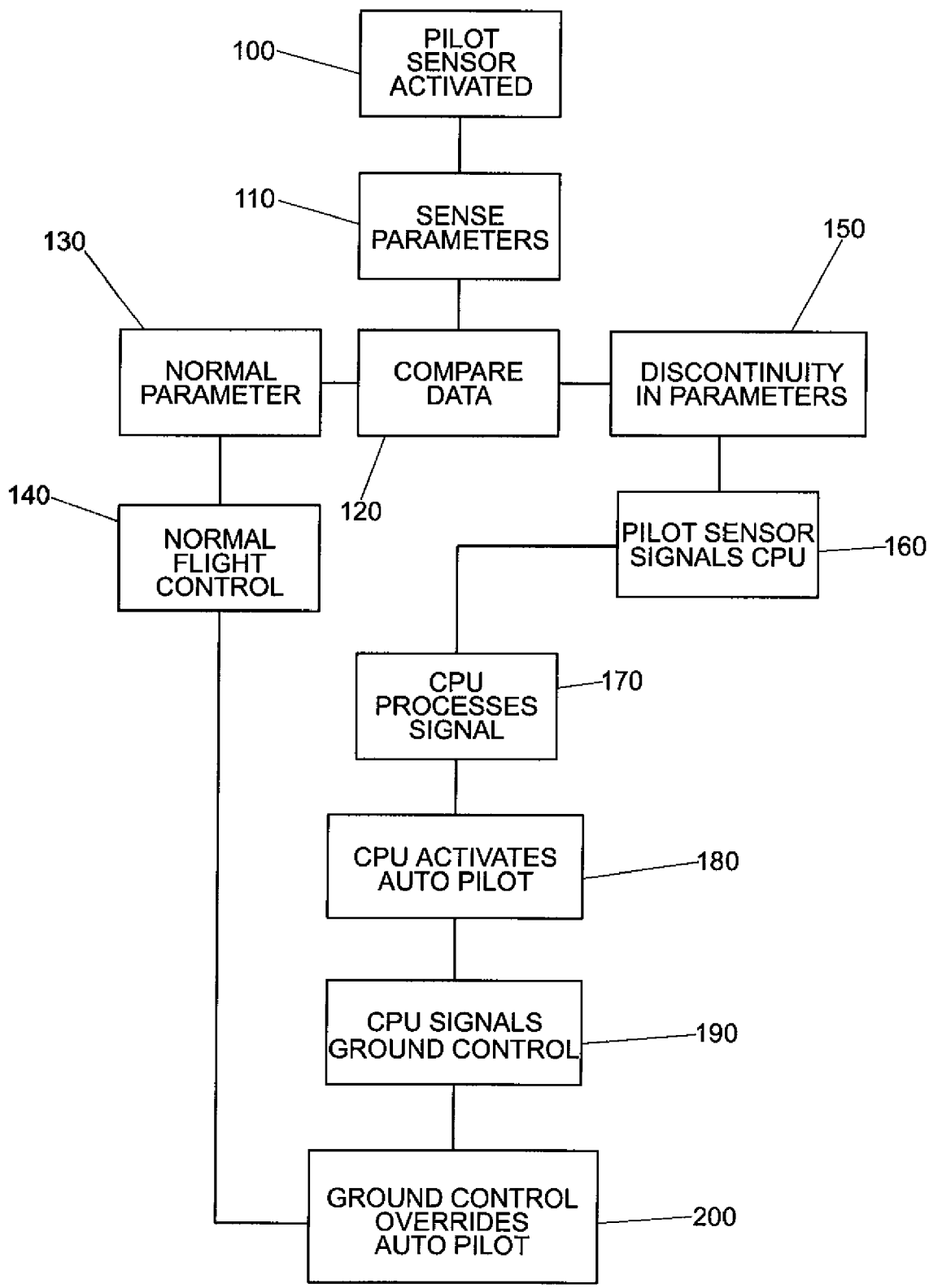
FIG. 2 is a flowchart of the operation of the exemplary anti-terrorist pilot sensor system.

Referring to FIG. 2, a flowchart of the operation of the exemplary anti-terrorist pilot sensor system is illustrated. The operation of the exemplary anti-terrorist pilot sensor system requires that the system is installed into an aircraft. With the system components in place, the pilot and/or the co-pilot, or any other crewmember that will take command of the aircraft can activate the system. For simplicity, and by no means limiting the scope of the invention, the pilot will be the primary user of the system. The pilot sensor is activated as shown in block 100. The pilot sensor is activated when the pilot attaches the pilot sensor proximate to the pilots body, and the pilot then enters a code through the input component and the pilot sensor stores the code for future use during the flight or in other embodiments, other periods of time, such as a week, a month, and the like. The pilot sensor is activated with entry of the code. The pilot sensor senses the biometric and/or physiological parameters of the pilot, block 110, and compares the sensed data with a standard set of biometric and physiological parameters for the pilot stored in a memory as data. The biometric and physiological data of the user can also be stored in the aircraft central processor unit. The biometric parameters will be compared, block 120, to biometric parameters of the user, stored as data in a memory. If the biometric parameters are determined to be acceptable matches, then the pilot sensor remains activated. The acceptable matches indicate normal parameters, block 130, and a normal operating condition. Then the aircraft will remain in a normal flight control mode, block 140.

The pilot sensor can also monitor the physiological parameters of the user. Certain ranges of the physiological parameters will be stored in the memory. The physiological parameters can be associated with various external stimuli the pilot may experience. The pilot will have elevated heart rate due to being nervous or scared. The pilot may have very low or no blood pressure in a case of pilot injury or death. The pilot sensor can monitor the biometric and physiological parameters of the pilot through the biometric sensors and physiological sensors. If any of the parameters fail to match the recorded parameters of the pilot that is compared from the memory then a discontinuity in the parameters exists, block 150. Upon sensing a discontinuity, the pilot sensor will send a signal to the aircraft central processor unit, block 160. The aircraft central processor unit will then perform a command and control process, block 170. If certain conditions are met, the aircraft central processor unit will send a signal to the autopilot device to activate the autopilot, block 180. The aircraft will then be flown on autopilot and manual control will be deactivated. The aircraft central processor will also send an emergency signal to ground control informing ground control of the conditions aboard the aircraft, block 190. If conditions aboard the aircraft are returned to a normal status, or the ground control determines a need, then override of the autopilot is available to the ground control. The ground control can send a command signal to the override that allows for manual control of the aircraft and deactivates the autopilot, block 200.

In an offnormal condition, such as a terrorist attack on the pilot or even a health emergency of the pilot, the pilot will exhibit abnormal physiological parameters and/or the biometric sensor will sense that the biometric parameters are no longer acceptable matches and a discontinuity of the parameters exists (i.e. the pilot sensor has been detached from the pilot). The discontinuity of the biometric parameters and/or the physiological parameters sensed by the pilot sensor can trigger a signal to be sent to the aircraft central processor unit. The system can place the aircraft on autopilot to prevent manual control of the aircraft by unauthorized users, such as highjackers, and terrorists. By placing the aircraft into autopilot as well as sending out an emergency signal to ground control, the aircraft can remain on a safe flight path. The ground control can activate emergency procedures, monitor the aircraft flight systems and cabin and provide assistance. While the aircraft is on autopilot, any highjacker can be prevented from altering the course of the aircraft and placing the aircraft in harms way. A return to normal parameters can also be an event that allows for deactivation of the autopilot and a return to the manual flight control. For example, a disconnection of the pilot sensor from the communication path can trigger the autopilot and a reconnection of the pilot sensor can allow for return to manual control.

Figure 3:
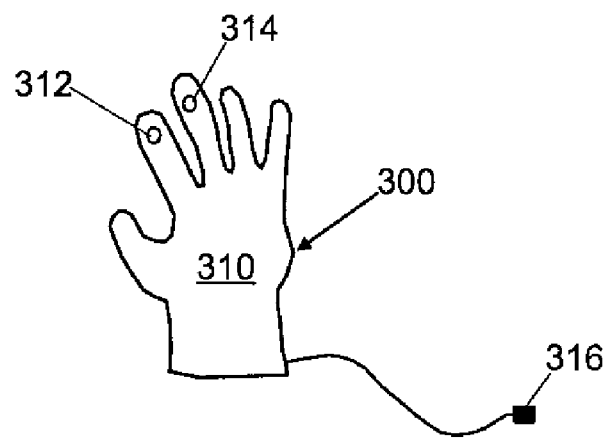
FIG. 3 is a diagram of an exemplary anti-terrorist aircraft pilot sensor glove.
Figure 4:
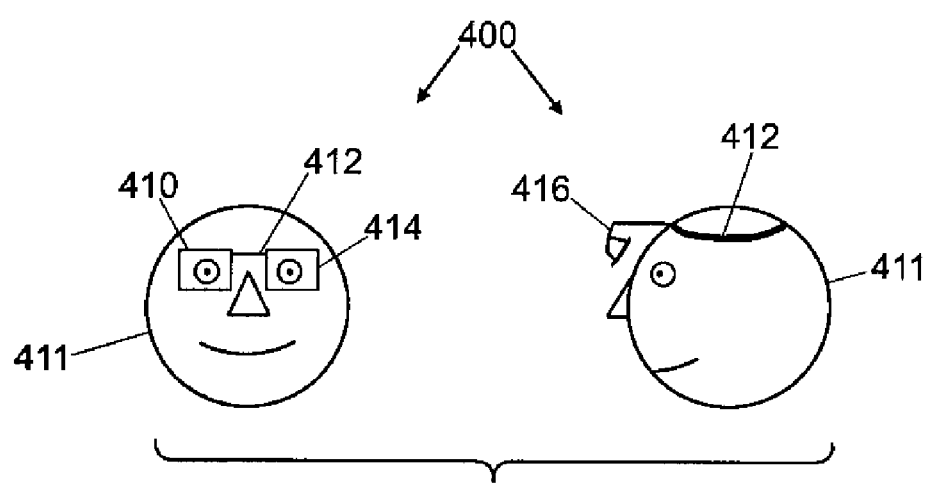
FIG. 4 is a diagram of an exemplary anti-terrorist aircraft pilot sensor headgear.

FIGS. 3 and 4 illustrate exemplary embodiments of pilot sensors 300 and 400. The embodiment of FIG. 3 is a pilot sensor 300 in the form of a glove 310. It is also contemplated that a pair of gloves (not shown) can be employed in an embodiment. The glove 310 includes a physiological sensor (vital function sensor) 312 and a biometric sensor (identification sensor) 314. The sensors can be placed at various locations on the glove 310 that are conducive to sensing the parameters. In one embodiment, the biometric sensor 312 can be located proximate to at least one fingertip to sense a fingerprint. The physiological sensor 314, in one embodiment, can be located proximate to the wrist to sense a pulse. It is contemplated that the location of the sensors will depend on the type of sensor employed. A cord 316 can be coupled to the glove 310 to operatively couple the glove 310 to the aircraft central processor unit (not shown). The cord 316 can be adapted for connection and disconnection to the input component (not shown) or other peripherals, such as a power source, battery charger, aircraft systems, and the like.

FIG. 4 illustrates another exemplary embodiment of the pilot sensor 400. The pilot sensor 400 is made up of a head set 410 worn on a pilot's head 411, including at least one physiological sensor 412 and at least one biometric sensor 414. The biometric sensor 414 and the physiological sensor 412 can read directly into the eye. The biometric sensor 414 can sense the eye retina pattern of the eye and the physiological sensor 412 can sense the pulse in the eye. In another embodiment, the physiological sensor 412 can be located along the head or even near the neck to sense various physiological parameters. Included with the headset 410 can be the input component 416 that can receive a visual or video input from the pilot or in the cockpit. Other video or audio equipment can be employed in parts of the aircraft to provide information to ground control.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of operating an anti-terrorist aircraft pilot sensor system comprising:
    activating a pilot sensor attached to the aircraft pilot;
    sensing biometric parameters of the aircraft pilot;
    sensing physiological parameters of the aircraft pilot;
    comparing said sensed biometric and physiological parameters of the aircraft pilot with stored data;
    detecting a discontinuity between said biometric and physiological parameters and said stored data;
    transmitting a signal to a central processor unit of the aircraft that said discontinuity exists;
    processing said signal in said central processor unit;
    activating an aircraft autopilot; and
    transmitting a signal to a ground control.

2. The method of operating an anti-terrorist aircraft pilot sensor system of claim 1 further comprising;
    transmitting an override signal from said ground control to an emergency override of the aircraft.

3. The method of operating an anti-terrorist aircraft pilot sensor system of claim 1 wherein said activating said pilot sensor includes inputting information into an input component.

4. The method of operating an anti-terrorist aircraft pilot sensor system of claim 1 wherein said sensing biometric parameters includes sensing a fingerprint.

5. The method of operating an anti-terrorist aircraft pilot sensor system of claim 1 wherein said sensing biometric parameters includes sensing an eye retina pattern.

6. The method of operating an anti-terrorist aircraft pilot sensor system of claim 1 wherein said sensing physiological parameters includes sensing a blood pressure.

7. The method of operating an anti-terrorist aircraft pilot sensor system of claim 1 wherein said sensing physiological parameters includes sensing a heart rate.

8. The method of operating an anti-terrorist aircraft pilot sensor system of claim 1 further comprising;
    detecting normal matches between said biometric and physiological parameters and said stored data, wherein said stored data includes both normal biometric and physiological data of said aircraft pilot.

9. The method of operating an anti-terrorist aircraft pilot sensor system of claim 1 wherein said discontinuity signal includes the disconnection of said pilot sensor from operative communication with said central processing unit.

10. The method of operating an anti-terrorist aircraft pilot sensor system of claim 1 wherein said transmitting a signal to said ground control includes transmitting an emergency signal having aircraft location, flight path and aircraft system indicators.

11. The method of operating an anti-terrorist aircraft pilot sensor system of claim 1 wherein said activating an aircraft autopilot includes deactivating manual control of the aircraft.

12. The method of operating an anti-terrorist aircraft pilot sensor system of claim 1 further comprising:
    monitoring the aircraft from ground control.

13. The method of operating an anti-terrorist aircraft pilot sensor system of claim 12 wherein said monitoring the aircraft from ground control includes sending and receiving information to the aircraft by use of audio and video.

14. An anti-terrorist aircraft pilot sensor system comprising:
    a pilot sensor comprising a glove that includes at least one finger print sensor and at least one pulse monitor;
    an input component operatively coupled to said pilot sensor;
    an aircraft central processor unit operatively coupled to said pilot sensor, said aircraft central processor unit including a transceiver operatively coupled to said aircraft central processor unit;
    an autopilot of the aircraft operatively coupled to said aircraft central processor unit;
    a ground control remote from the aircraft operatively coupled to said aircraft central processor unit, said ground control including a transceiver coupled to said ground control; and
    an aircraft override operatively coupled to said ground control and operatively coupled to said aircraft central processor unit.

15. An anti-terrorist aircraft pilot sensor system comprising:
    a pilot sensor comprising a head set that includes at least one eye retina pattern sensor and at least one pulse monitor;
    an input component operatively coupled to said pilot sensor;
    an aircraft central processor unit operatively coupled to said pilot sensor, said aircraft central processor unit including a transceiver operatively coupled to said aircraft central processor unit;
    an autopilot of the aircraft operatively coupled to said aircraft central processor unit;
    a ground control remote from the aircraft operatively coupled to said aircraft central processor unit, said ground control including a transceiver coupled to said ground control; and
    an aircraft override operatively coupled to said ground control and operatively coupled to said aircraft central processor unit.

* * * * *